US006600901B1

(12) United States Patent
Koehne et al.

(10) Patent No.: US 6,600,901 B1
(45) Date of Patent: Jul. 29, 2003

(54) MOBILE PHONE HAVING PLURAL OPERATION MODES WITH DIFFERENT RADIATION PATTERNS

(75) Inventors: Leif Koehne, Vodskov (DK); Per D. Pedersen, Aalborg (DK); Pia Thomsen, Aabybro (DK); Ole Jagielski, Aalborg (DK)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/392,435

(22) Filed: Sep. 9, 1999

(30) Foreign Application Priority Data

Oct. 27, 1998 (EP) .......................................... 98120285

(51) Int. Cl.[7] ............................ H04B 7/14; H01Q 1/00

(52) U.S. Cl. .......................... 455/25; 455/575; 455/90; 343/724

(58) Field of Search ................................ 455/103–105, 455/121, 123, 117, 129, 575, 90, 550, 562, 25, 132; 343/702, 725, 729, 724

(56) References Cited

U.S. PATENT DOCUMENTS 5,541,609 A * 7/1996 Stutzman et al. ........... 343/702
6,041,220 A * 3/2000 Suguro ........................ 455/90
6,175,334 B1 * 1/2001 Vannatta et al. ............ 343/702
6,208,300 B1 * 3/2001 Johnson ...................... 343/702
6,212,413 B1 * 4/2001 Kiesi ........................... 455/90

FOREIGN PATENT DOCUMENTS

DE 197 23 331 A1 12/1998

* cited by examiner

*Primary Examiner*—Vivian Chin
*Assistant Examiner*—Eliseo Ramos-Feliciano
(74) *Attorney, Agent, or Firm*—Michael J. Striker

(57) ABSTRACT

The mobile phone (1) has an antenna arrangement (5) for radiating different radiation patterns (30, 35, 40) according to an actual operation mode of the mobile phone (1). The different radiation patterns include two radiation patterns that avoid introducing radiation into the head of a user during an active telecommunications connection. At least two operation modes of the mobile phone (1) are assigned to a different radiation patern respectively. During an active operation mode, the assigned radition pattern is selected and activated. A change between the operation mode causes switching between the assigned radiation patterns. In a preferred embodiment the radiation pattern is omindirectional (30) during an idle mode, is directional (35) during active telecomunications connections and is approximately omindirectional with a preferential direction (40) during other active telecommunications connections in which control signal are exchanged.

6 Claims, 3 Drawing Sheets

MOBILE PHONE HAVING PLURAL OPERATION MODES WITH DIFFERENT RADIATION PATTERNS

BACKGROUND OF THE INVENTION

The present invention relates to a mobile phone. A mobile phone including an antenna arrangement with an antenna element, which is able to radiate in two different radiation patterns, has already been described in German Patent application DE 197 23 331.

PRIOR ART

The invention proceeds from a mobile phone in accordance is with the generic class of the independent patent claim.

It is already known from the not yet published German patent application DE 197 23 331, that a mobile phone comprises an antenna arrangement with an antenna element which is able to radiate in two different radiation patterns.

SUMMARY OF THE INVENTION

It is an object of the present invention to provide an improved mobile phone of the above-described type having a plurality of operation modes, especially a mobile phone which avoids introducing radiation into the head of a user during an active telecommunications connection.

According to the invention the mobile phone has plural operation modes and comprises

- an antenna arrangement for propagating radiation in a plurality of different radiation patterns Including at least two radiation patterns that are formed to avoid introducing radiation into a head of a user of the mobile phone when the phone is next to the head during an active telecommunication connection, which antenna arrangement includes one or more antenna elements;
- means for assigning at least two of the plural operation modes to a respective different radiation pattern;
- means for changing operation between the operation modes; and
- means for selecting and activating an assigned radiation pattern selected from the plurality of the different radiation patterns when the corresponding operation mode is active.

The mobile phone according to the invention has the advantage that at least two operation modes of the mobile phone are assigned to a different radiation pattern, respectively, so that during an active operation mode the assigned radiation pattern is selected and activated, and a change between two operation modes causes switching between the assigned radiation patterns. In this way the requirements for the radiation patterns may be adapted to the actual operation mode of the mobile phone. Thereby a compromise may be achieved between the required antenna performance and the amount of radiation In the head of the user depending on the actual operation mode. A more flexible use of the mobile phone is therefore possible.

The features of the dependent patent claims enable further improvement of the invention.

It is very advantageous if only one antenna element is provided in a preferred embodiment of the antenna arrangement to realize at least two different radiation patterns. In this way, the same number of radiation patterns may be realized with fewer antenna elements Therefore, material and costs may be saved as well as weight of the mobile phone.

Another advantage consists in that the antenna arrangement is switchable between an omnidirectional and a directional radiation pattern. Therefore, it is possible to profit from the advantage of an omnidirectional radiation pattern with for example good overall radiation performance as well as from the advantage of a directional radiation pattern with for example a prevention of high radiation in the head of the user according to the requirements defined by the actual or activated operation mode of the mobile phone.

Another advantage consists in that the first radiation pattern is assigned to an idle operation mode during which the mobile phone is not in a telecommunication connection, especially in an on-hook-state, and transmitting control signals, and that second radiation pattern is assigned to a first dedicated operation mode during which the mobile phone is in an active telecommunication connection, especially in an off-hook-state. On this way, a radiation pattern may be chosen for the idle operation mode which allows good overall antenna performance, because in the idle operation mode the mobile phone may be carried inside a jacket or lying on a table and thereby preventing directional radiation. In the dedicated operation mode a directional radiation pattern may be chosen to prevent radiation into the head of the user. Therefore, a good compromise between the performance of the antenna arrangement and the prevention of radiation into the head of the user dependent on the operation mode may be realized.

Another advantage consists in that the third radiation pattern is assigned to a second dedicated operation mode during which the mobile phone is transmitting control signals in an active telecommunication connection, especially in an off-hook-state. On this way, a good overall performance of the antenna arrangement may be chosen in fractions of times when the mobile phone has to transmit control signals to the corresponding base station in an active telecommunication connection state. Thereby, it may be ensured that the control signals reach the corresponding base station without allowing the radiation into the head of the user during the times of the telecommunication connection where no control signals has to be transmitted. This would also represent a good compromise between telecommunication requirements to keep up a telecommunication connection using the transmission of control signals and the reduction of health risk by minimizing the radiation into the head of the user.

BRIEF DESCRIPTION OF THE DRAWINGS

Examples of the invention are shown in the figures and explained in greater detail in the description below.

DESCRIPTION

Figure 1:
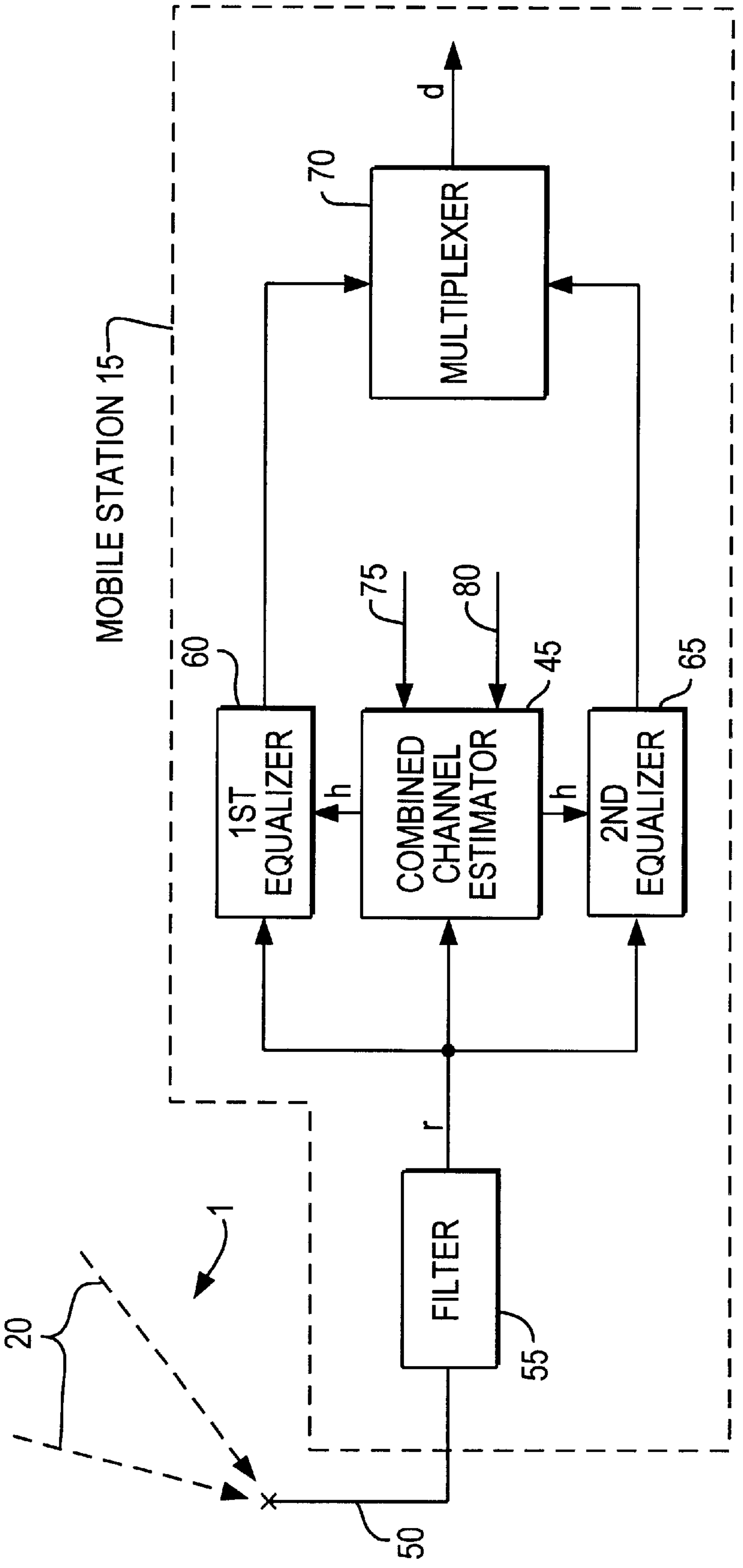
FIG. 1 shows a block diagram of a first example of a mobile phone according to the invention.

In FIG. 1 designates 1 a mobile phone comprising a baseband part 20 and a radio frequency part 25. The baseband part 20 is connected to the radio frequency part 25. The radio frequency part 25 is connectable via a first switch 45 to a first antenna element 10 providing a first radiation pattern 30 which is an omnidirectional radiation pattern. The radio frequency part 25 is connectable to a second antenna element 15 via a second switch 50, the second antenna element 15 providing a second radiation pattern 35 which is a directional radiation pattern. The radio frequency part 25, the first switch 45 and the second switch 50 are arranged in a first radio frequency module 70. The first switch 45 is controlled via a first control line 80 by the baseband part 20. The second switch 50 is controlled via a second control line 85 by the baseband part 20. The first antenna element 10 and the second antenna element 15 constitute an antenna arrangement 5.

According to FIG. 1, the first switch 45 is closed and the second switch 50 is open. Therefore, only the first antenna element 10 is connected to the radio frequency part 25.

Therefore, the omnidirectional radiation pattern 30 is selected for the transmission of signals from the mobile phone 1. The omnidirectional radiation pattern 30 is assigned to an idle operation mode during which the mobile phone 1 is not in a telecommunication connection as for example an active call. Thereby, the mobile phone 1 normally is in an on-hook-state but may also be in an off-hook-state. In the idle operation mode, the mobile phone 1 receives and/or transmits control signals to a corresponding base station. As in the idle operation mode, the mobile phone 1 normally is carried inside a jacket or lying on a table for example, the antenna arrangement 5 is sufficiently distanced from the head of the user. Therefore, radiation into the head of the user is essentially prevented in the idle operation mode. To ensure the transmission of the control signals to the corresponding base station the omnidirectional radiation pattern 30 is assigned to the idle operation mode taking account of disadvantageous radiation situations as described above for example for the mobile phone 1 carried inside a jacket.

The directional radiation pattern 35 may be assigned to a first dedicated operation mode during which the mobile phone 1 is in an active telecommunication connection as for example an active call, whereby the mobile phone 1 normally is in an off-hook-state. In the case of a speech telecommunication connection, the first dedicated operation mode may also be called a conversation mode. In conversation mode, the user normally keeps the mobile phone 1 on an ear. Therefore, radiation into the head of the user should be prevented and the directional radiation pattern 35 is selected and assigned to the first dedicated operation mode. Thereby, the radiation should be directed away from the head of the user to minimize the power wasted in his head.

According to FIG. 1 with the first switch 45 closed and the second switch 50 open, the mobile phone 1 is in the idle operation mode. If the user wants to make a call or receives a call, the operation mode of the mobile phone 1 is changed from the idle operation mode to the first dedicated operation mode. Thereby, the baseband part 20 controls via the first control line 80 the first switch 45 in such a way, that the first switch 45 will be opened. The baseband part 20 via the second control line 85 controls the second switch 50 in such a way, that the second switch 50 will be closed.

Then in the first dedicated operation mode, the second antenna element 15 is connected to the radio frequency part 25, whereby the first antenna element 10 is disconnected from the radio frequency part 25. Thereby, the directional radiation pattern 35 is realized for the first dedicated operation mode. On this way, the antenna arrangement 5 is switched from the omnidirectional radiation pattern 30 to the directional radiation pattern 35. If the telecommunication connection is finished, the operation mode of the mobile phone 1 changes from the first dedicated operation mode to the idle operation mode and the baseband part 20 controls the first switch 45 via the first control line 80 to be closed and the second switch 50 via the second control line 85 to be opened. Therefore, the first antenna element 10 will be reconnected to the radio frequency part 25 and the second antenna element 15 will be disconnected from the radio frequency part 25. In this case, the antenna arrangement 5 is switched from the directional radiation pattern 35 to the omnidirectional radiation pattern 30.

It is also possible to provide a third operation mode, for example a second dedicated operation mode during which the mobile phone is transmitting control signals in an active telecommunication connection as for example an active call, whereby the mobile phone 1 normally is in the off-hook-state. The transmission of the control signals from the mobile phone 1 to the corresponding base station in an active telecommunication connection is used to inform the corresponding base station about the signal quality. Thereby, the control signals are transmitted in fractions of times during the active telecommunication connection. A third radiation pattern may be assigned to the second dedicated operation mode. Thereby, the third radiation pattern may correspond to the first radiation pattern 30 and therefore to the omnidirectional radiation pattern of the first antenna element 10. Therefore, it may be ensured, that the control signals, transmitted from the mobile phone 1 in an active telecommunication connection, reach the corresponding base station. On this way, in an active telecommunication connection of the mobile phone 1 the first dedicated operation mode changes to the second dedicated operation mode for fraction of times. The baseband part 20 thereby controls via the first control line 80 the first switch 45 and via the second control line 85 the second switch 50 to connect the first antenna element 10 to the radio frequency part 25 and to disconnect the second antenna element 15 from the radio frequency part 25 during the fractions of time when the second dedicated operation mode is active and to connect the second antenna element 15 to the radio frequency part 25 and to disconnect the first antenna element 10 from the radio frequency part 25 when the first dedicated operation mode is active. On this way, the omnidirectional radiation pattern 30 is selected in an active telecommunication connection only during the fractions of time for the transmission of the control signals, whereby the radiation into the head of the user is minimized in an active telecommunication connection.

Figure 3:
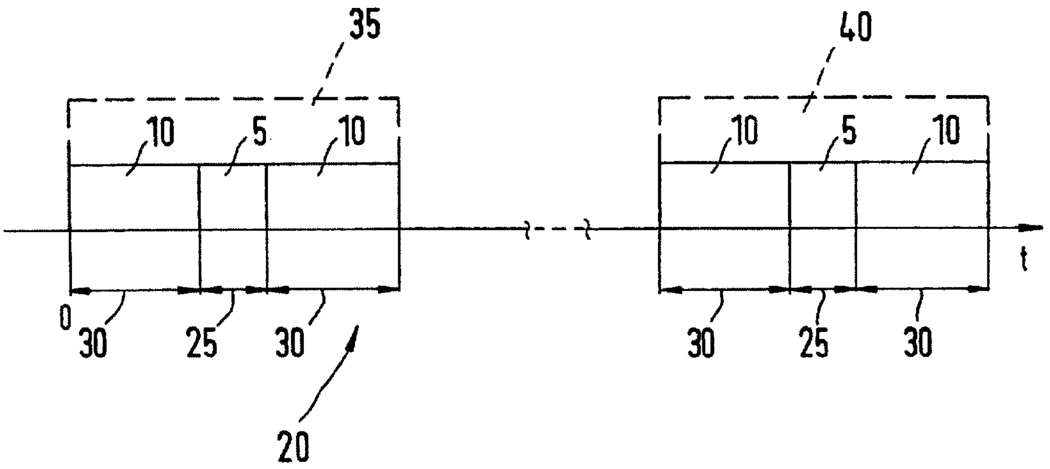
FIG. 3 shows a combined radiation pattern.

To improve the signal quality for the transmission of the control signals in the idle operation mode or in the second dedicated operation mode, both antenna elements 10, 15 may be connected via the switches 45, 50 to the radio frequency part 25 during the idle operation mode and the second dedicated operation mode. Supposing that the two antenna elements 10, 15 are located close to each other, the connection of both antenna elements 10, 15 to the radio frequency part 25 via closed switches 45, 50 will result in a third radiation pattern 40 which is as superposition of the omnidirectional radiation pattern 30 and the directional radiation pattern 35. The third radiation pattern in this case will be an omnidirectional radiation pattern with one privileged direction as shown in FIG. 3. It is also possible, to assign the third radiation pattern 40 to the idle operation mode and the first radiation pattern 30 to the second dedicated operation mode. Therefore, the radiation into the head of the user caused by the second dedicated operation mode is kept at a minimum.

Figure 2:
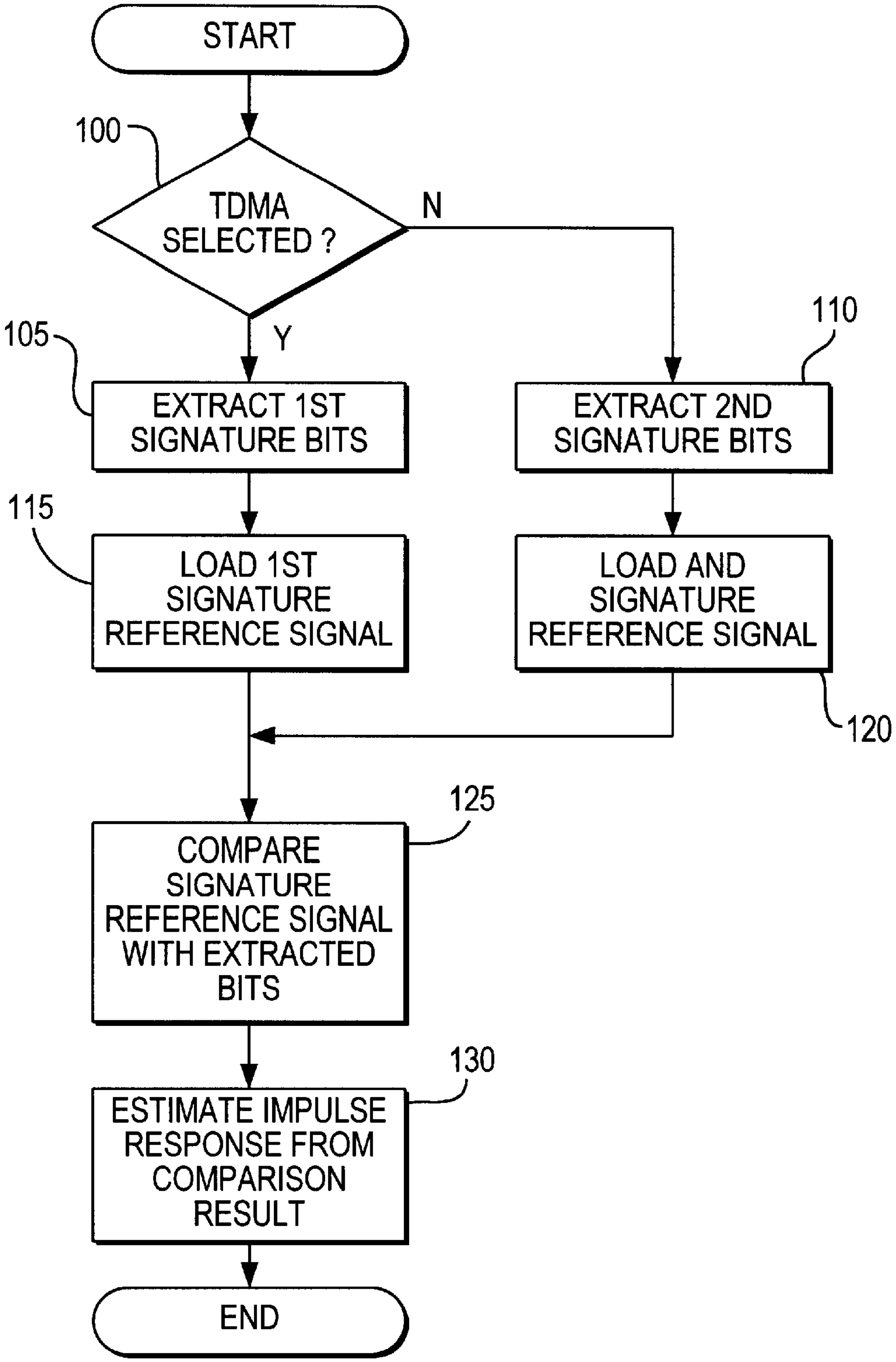
FIG. 2 shows a block diagram of a second example of a mobile phone according to the invention.

According to the example of FIG. 1, each antenna element 10, 15 provides exactly one radiation pattern 30, 35. According to FIG. 2, a second example of a mobile phone 1 according to the invention is described whereby a third antenna element 95 is provided to realize the first and the second radiation pattern 30, 35. In FIG. 2 the baseband part 20 is also connected to the radio frequency part 25. The third antenna element 95 constitutes the antenna arrangement 5. The third antenna element 95 is connectable via a third switch 55 either to a first antenna network 60 or to a second antenna network 65. The first antenna network 60 and the second antenna network 65 are connected to the radio frequency part 25. The radio frequency part 25, the first antenna network 60, the second antenna network 65 and the third switch 55 constitute a second radio frequency module 75. The third switch 55 is controlled via a third control line 90 by the baseband part 20. Depending on the connection of the third antenna element 95 to the first antenna network 60 or the second antenna network 65, two different radiation patterns may be realized by the antenna arrangement 5. If the third antenna element 95 is connected via the third switch 55 to the first antenna network 60, the first radiation pattern 30 is realized as an omnidirectional radiation pattern. If the third antenna element 95 is connected via the third switch 55 to the second antenna network 65, the second radiation pattern 35 is realized as a directional radiation pattern. Therefore, the same functionality as described according to FIG. 1 may be achieved with the mobile phone 1 according to FIG. 2 except the combination or superposition of the first radiation pattern 30 and the second radiation pattern 35. In the idle operation mode and in the second dedicated operation mode the baseband part 20 controls the third switch 55 via the third control line 90 to connect the third antenna element 95 to the first antenna network 60 and therefore ensuring the first radiation pattern 30 of the antenna arrangement 5. In the first dedicated operation mode, the baseband part 20 controls the third switch 55 via the third control line 90 to connect the third antenna element 95 to the second antenna network 65, therefore ensuring the realization of the second radiation pattern 35 by the antenna arrangement 5.

Figure 4:
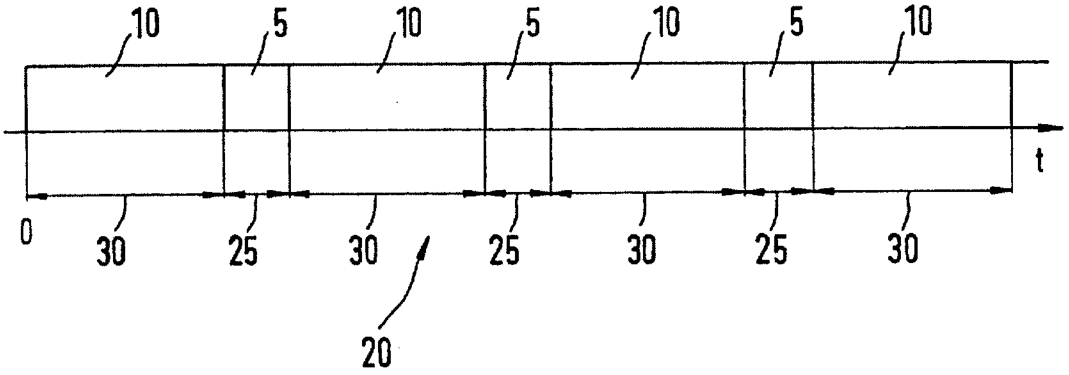
FIG. 4 shows an algorithm for a baseband part in the mobile phone to select a radiation pattern.

FIG. 4 shows an algorithm for the control of the radiation patterns and the operation modes in the baseband part 20 of the mobile phone 1. The algorithm may be realized in the baseband part 20 by a program running on a processor of the baseband part 20. The program starts when the baseband part 20 detects the change of the actual operation mode. This happens for example by user interaction via a keyboard not shown in FIG. 1 and FIG. 2 of the mobile phone 1, whereby the keyboard is connected to the baseband part 20. The user could for example dial a telephone number on the keyboard to initiate an active call and therefore an active telecommunication connection. The change between the first dedicated operation mode and the second dedicated operation mode may be initiated by the baseband part 20 itself according to system requirements which are known or programmed in the baseband part 20 of the mobile phone 1. If a new operation mode has to be installed for the mobile phone 1, the baseband part 20 has to determine this new operation mode. Therefore, at step 100 of the algorithm shown in FIG. 4, the baseband part 20 determines if the new operation mode is the idle operation mode for example after finishing an active telecommunication connection. If this is the case, the algorithm branches to step 105, otherwise it branches to step 110. At step 105 the baseband part 20 determines the radiation pattern required for the idle operation mode and controls the first switch 45 and the second switch 50 according to FIG. 1 or the third switch 55 according to FIG. 2 to realize the radiation pattern assigned to the idle operation mode at the antenna arrangement 5 as described above according to FIG. 1 and FIG. 2. Afterwards the program is left. At step 110, the baseband part 20 determines if the first dedicated operation mode is the new operation mode selected for example by a dialed telephone number on the keyboard of the mobile phone 1. If this is the case, the program branches to step 115, otherwise it branches to step 120. At step 115 the baseband part 20 controls the first switch 45 and the second switch 50 according to FIG. 1 or the third switch 55 according to FIG. 2 to realize the radiation pattern assigned to the first dedicated operation mode at the antenna arrangement 5. Afterwards, the program is left. At step 120, the baseband part 20 determines if the second dedicated operation mode is selected. If this is the case, the program branches to step 125, otherwise the program is left. At step 125, the baseband part 20 controls the first switch 45 and the second switch 50 according to FIG. 1 or the third switch 55 according to FIG. 2 to realize the radiation pattern assigned to the second dedicated operation mode at the antenna arrangement 5. Afterwards the program is left.

The assignment of radiation patterns to operation modes is described above only as an example and may be adapted according to the requirements of the telecommunications system in which the mobile phone 1 is used and according to appropriate health aspects. Every assignment of radiation patterns to operation modes is possible.

It is also possible to provide more than two antennas with different radiation patterns and to combine radiation patterns of more than two antennas for example by superposition. There could be a look-up table in the processor of the baseband part 20 in which each operation mode is assigned to a radiation pattern which has to be realized by the antenna arrangement 5.

It would also be possible to provide antenna elements or at least one antenna element to realize exactly one radiation pattern and at least one antenna element to realize at least two different radiation patterns in one and the same antenna arrangement 5 connectable to the radio frequency part 25. It may also be possible to provide at least one antenna element to realize more than two different radiation patterns.

The mobile phone 1 may be any terminal operating in any wireless system.

What is claimed is:

1. A mobile phone (1) having plural operation modes, said plural operation modes including an idle operation mode and a conversation mode, wherein in said idle operation mode control signals are transmitted to or received from a base station and an active telecommunication connection is not established with the mobile phone and wherein in said conversation mode said active telecommunication connection is established with the mobile phone, said mobile phone comprising (1):

an antenna arrangement (5) consisting of at least one antenna element (10,15; 95):

means (70, 75) for supplying electrical energy to said antenna arrangement so as to propagate radiation from said at least one antenna element in a selected one of at lea two different radiation patterns (30, 35, 40), wherein said at least two different radiation patterns include an omnidirectional radiation pattern (30) in which said radiation is propagated from the at least one antenna element equally in all directions and a directional radiation pattern (35) in which said radiation is propagated in one privileged direction such that said radiation does not enter a head of a user when the mobile phone is placed against an ear of the user;

means (20) for changing operation mode of the mobile phone between said idle operation mode and said conversation mode; and means for controlling said means for supplying electrical energy to said antenna arrangement to select said selected one of said at least two different radiation patterns propagated from said at least one antenna element, so as to propagate said radiation during said idle operation mode in said omnidirectional radiation pattern and during said conversation mode in said directional radiation pattern with said one privileged direction, so that said radiation is prevented from entering said head of said user during said conversation mode.

2. The mobile phone as defined in claim 1, wherein said antenna arrangement consists of a first antenna element (10) for radiating said omnidirectional radiation pattern (30) and a second antenna element (15) for radiating said directional radiation pattern (35) with said one privileged direction: said means for supplying said electrical energy to said antenna arrangement comprises a radio frequency part (25); and said means for controlling comprises a base band part (20), a first switch (45) connected between said radio frequency part (25) and said first antenna element (10) and a second switch (50) connected been said radio frequency part (25) and said second antenna element (15), wherein said base band part (20) controls said first switch and said second switch, so as to connect said first antenna element (10), but not said second antenna element, to said radio frequency part (25) during said idle operation mode and said second antenna element (15), but not said first antenna element, to said radio frequency part (25) during said conversation mode.

3. The mobile phone as defined in claim 2, wherein said plural operation modes include another operation mode (40) in which additional control signals are transmitted during said active telecommunication connection and wherein said base band part (20) controls said first switch and said second switch so as to alternately connect said first antenna element (10) and said second antenna element (15) to said radio frequency part (25) during said another operation mode so that said additional control signals are transmitted and received during said active telecommunication connection.

4. The mobile phone as defined in claim 2, wherein said mobile phone is in an on-hook state during said idle operation mode and said mobile phone is in an off-hook state during said conversation mode.

5. The mobile phone as defined in claim 1, wherein said antenna arrangement consists of only one antenna element (95) for propagating said omnidirectional radiation pattern (30) or said directional radiation pattern (35) with said one privileged direction; said means for supplying said electrical energy to said antenna arrangement comprises a radio frequency part (25) connected with a first antenna network (60) and a second antenna network (65); and said means for controlling comprises a base band part (20) and a third switch (55), said third switch connecting said radio frequency part (25) and either said first antenna network (60) or said second antenna network (65) with said only one antenna element (95), so that said radio frequency part (25) and said first antenna network (50) are connected to said only one antenna element (95) during said idle operation mode and said radio frequency part (25) and said second antenna network (65) are connected to said only one antenna element (95) during said conversation mode.

6. The mobile phone as defined in claim 5, wherein said plural operation modes include another operation mode (40) in which additional control signals are transmitted during said active telecommunication connection and wherein said base band part (20) controls said third switch (55) so as to alternately connect said first antenna network (60) and said second antenna network (65) to said only one antenna element (95) during said another operation mode so that said additional control signals are transmitted and received during said active telecommunication connection.

* * * * *